UNITED STATES PATENT OFFICE.

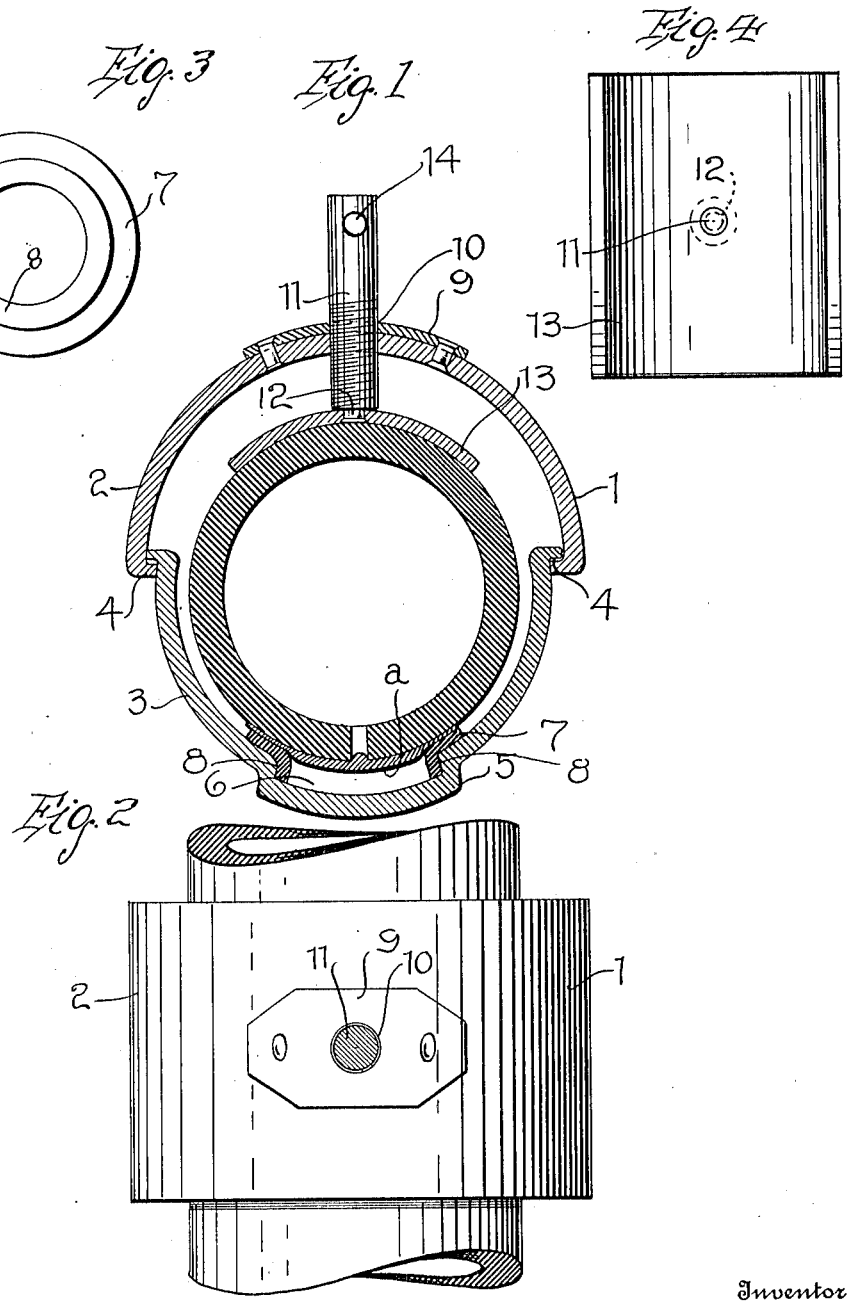

ELMER D. VAN DOREN, OF BEARDSTOWN, ILLINOIS.

RUBBER-PATCH CLAMP FOR HOSE.

1,096,971.

Specification of Letters Patent.

Patented May 19, 1914.

Application filed February 19, 1913. Serial No. 749,555.

*To all whom it may concern:*

Be it known that I, ELMER D. VAN DOREN, a citizen of the United States, residing at Beardstown, in the county of Cass and State of Illinois, have invented certain new and useful Improvements in Rubber-Patch Clamps for Hose, of which the following is a specification, reference being had to the accompanying drawings.

This invention relates to new and useful improvements in pipe or hose clamps, the object of the invention being to provide a clamp which is particularly adapted for application to the hose of air brakes upon cars for stopping a leak or fracture which might occur therein, but it is to be understood that the device may be applied equally as well to any form of pipe or flexible hose.

It is apparent to the employees of railroads that when an air brake hose breaks, it takes considerable time to remove the hose and replace a new one, thus causing a delay of a train and any trains which may follow closely behind the delayed train.

Another object of the invention is to provide a device which can be quickly and readily applied to the broken hose and close the opening to prevent leakage until the train arrives at the station where the broken hose can be readily replaced for a new one during the stop at the station for discharging and receiving passengers, express or freight, according to the nature of the train, or left on if hose is otherwise good.

A further object of the invention is to provide a clamp of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a transverse sectional view of my improved hose clamp; Fig. 2 is a top plan view; Fig. 3 is a bottom plan view of the gasket; and Fig. 4 is an interior view of one of the clamping sections.

Referring more particularly to the drawings, 1 indicates my improved clamp which comprises a sleeve formed in two semi-circular sections 2 and 3, having their longitudinal edges bent at right angles in opposite directions and clamped together, as shown at 4. The section 3 is provided at its lower intermediate portion with a substantially oval shaped offset 5, forming upon the inner side of the section 3, a recess 6 which is of substantially the same shape as the offset. A gasket 7 is provided having a flange 8 formed integral therewith and adapted to be disposed within the recess 6 and engage the walls thereof, said gasket overlapping the recess and disposed upon the inner side of the section, as shown at 8. Secured to the outer periphery of the section 2 at the intermediate portion thereof is a plate 9 having a threaded opening 10 formed in the central portion thereof and adapted to communicate with a similar opening formed in the section 2 and in which is mounted an adjusting screw 11. The inner end of the adjusting screw 11 is provided with a reduced portion 12 upon which is mounted a curved plate 13, said plate being adapted to conform to the shape of a pipe, hose or other device to which the clamp is applied. The outer end of the adjusting screw 11 is provided with a transverse opening 14 in which is adapted to be arranged a pin, nail or other suitable instrument whereby the screw may be turned to clamp the plate 13 against the periphery of a pipe, hose or the like.

The sections 2 and 3 are preferably constructed of resilient sheet metal so that when the angular edges thereof are secured together, the resiliency of the sections will securely hold said edges into clamping engagement with each other. In applying my improved clamp to a pipe, hose or the like, a suitable patch *a* is arranged over the opening where the break has occurred, the sections 2 and 3 are then clamped to the hose at the point where the patch *a* has been applied. The gasket 7 is adapted to be arranged so that the same will surround and inclose the break in the hose, the plate 13 engaging the side of the hose opposite the break. The opposite screw 11 is then manipulated to securely clamp the plate 13 upon the hose to prevent longitudinal movement of the clamp. From this it will be apparent that the break in the hose or pipe may readily be stopped until the train reaches the station where it will be possible to replace the fractured hose with a new one. It will also be apparent that I have provided a simple and durable clamp which can be quickly and easily applied to a pipe, hose or the like, and which can be readily removed therefrom. It will also be apparent that the device is extremely simple in construction and can be manufactured at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claim.

What I claim is:—

A hose clamp including two semicircular sections having their longitudinal edges bent at right angles in opposed directions and removably clamped together, an offset formed in the central portion of one of said sections and providing an oval shaped recess, opening upon the inner side of said section, an open center oval shaped gasket arranged within said recess and engaging the walls thereof, an annular flange formed upon said gasket which extends on to the inner wall of the section and is adapted to engage the outer edge of a patch, a clamping plate and an adjusting screw having its lower end secured to said clamping plate and removably mounted within the second section whereby the adjustment of said screw will securely clamp the gasket to a hose or the like arranged between said sections.

In testimony whereof I hereunto affix my signature in the presence of two witnesses.

ELMER D. VAN DOREN.

Witnesses:
LLOYD M. McCLURE,
EDITH TIEMEYER.

Copies of this patent may be obtained for five cents each, by addressing the "Commissioner of Patents, Washington, D. C."